(12) United States Patent
Eng et al.

(10) Patent No.: US 7,873,784 B2
(45) Date of Patent: *Jan. 18, 2011

(54) METHOD AND APPARATUS FOR EVALUATING AND IMPROVING DISK ACCESS TIME IN A RAID SYSTEM

(75) Inventors: Michael Eng, San Jose, CA (US); David Wong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/118,611

(22) Filed: May 9, 2008

(65) Prior Publication Data

US 2008/0263276 A1 Oct. 23, 2008

Related U.S. Application Data

(63) Continuation of application No. 10/831,382, filed on Apr. 22, 2004, now Pat. No. 7,383,400.

(51) Int. Cl.
*G06F 12/00* (2006.01)
(52) U.S. Cl. .......................... 711/114; 711/154; 714/47
(58) Field of Classification Search .................. 711/114, 711/154; 714/47
See application file for complete search history.

(56) References Cited

U.S. PATENT DOCUMENTS

| | | | |
|---|---|---|---|
| 5,623,598 | A | 4/1997 | Voigt et al. |
| 5,724,552 | A | 3/1998 | Taoda |
| 5,875,459 | A | 2/1999 | Taoda |
| 5,953,689 | A | 9/1999 | Hale et al. |
| 6,263,298 | B1 | 7/2001 | Kerman et al. |
| 6,606,585 | B1 | 8/2003 | Borowsky et al. |
| 6,687,793 | B1 | 2/2004 | Thomas et al. |
| 7,134,053 | B1 | 11/2006 | Moore |
| 7,213,103 | B2 | 5/2007 | Eng et al. |
| 7,275,179 | B1 | 9/2007 | Coatney |
| 2001/0055226 | A1 | 12/2001 | Miura et al. |
| 2002/0103969 | A1 | 8/2002 | Koizumi et al. |
| 2003/0074528 | A1 | 4/2003 | Soejima et al. |

(Continued)

FOREIGN PATENT DOCUMENTS

JP 09265357 A 10/1997

OTHER PUBLICATIONS

Tobagi et al. "Streaming RAID-A Disk Array Management System for Video Files." No date available, Starlight Networks, Inc.

(Continued)

*Primary Examiner*—Kevin L Ellis
*Assistant Examiner*—Jared I Rutz
(74) *Attorney, Agent, or Firm*—Beyer Law Group LLP

(57) ABSTRACT

Techniques for improving access time in data storage systems are disclosed. These techniques can be used to prevent undesirable access delays that are often experienced in conventional storage systems. "Slow-access" can be defined as an access operation that does not successfully complete within a predetermined amount of time. The "slow-access" time can, for example, be defined based on a system requirement, specification, or a particular need of a specific application. As such, when detected "slow-access" indicates a potential performance problem that can manifest in undesirable effects. A data storage system is evaluated for potential performance problems by scanning it for "slow-access." In addition, preventative measures are taken to prevent occurrence of a "slow-access" once it has been identified. These measures can prevent the undesirable effects experienced in conventional storage systems. This also means that specific system or application requirements can be certified and met.

25 Claims, 7 Drawing Sheets

U.S. PATENT DOCUMENTS

| | | |
|---|---|---|
| 2003/0212872 A1 | 11/2003 | Patterson et al. |
| 2004/0024900 A1 | 2/2004 | Breiter et al. |
| 2004/0103189 A1 | 5/2004 | Cherkasova et al. |
| 2004/0148444 A1 | 7/2004 | Thomas et al. |
| 2005/0138284 A1 | 6/2005 | Cohn et al. |
| 2005/0223269 A1 | 10/2005 | Stolowitz |
| 2005/0240742 A1 | 10/2005 | Eng et al. |

OTHER PUBLICATIONS

Computer dictionary, 1997, Microsoft Press, Third Edition, p. 121.
Final Office Action from U.S. Appl. No. 10/303,121, May 30, 2006, 5 pages.
Final Office Action from U.S. Appl. No. 10/831,382, Nov. 2, 2006, 27 pages.
Office Action from U.S. Appl. No. 10/831,417, May 12, 2006, 14 pages.
Final Office Action from U.S. Appl. No. 10/831,417, Aug. 29, 2006, 18 pages.
Final Office Action from U.S. Appl. No. 11/542,389, Jul. 12, 2007, 16 pages.
Office Action from U.S. Appl. No. 10/303,121, Mar. 2, 2006, 10 pages.
Office Action from U.S. Appl. No. 10/831,382, Apr. 20, 2007, 28 pages.
Office Action from U.S. Appl. No. 10/831,382, May 22, 2006, 24 pages.
Office Action from U.S. Appl. No. 11/542,389, Mar. 7, 2007, 17 pages.
Office Action from U.S. Appl. No. 10/303,121, Nov. 10, 2005, 17 pages.
Office Action from U.S. Appl. No. 11/542,389, dated Nov. 14, 2007.
Notice of Allowance and Allowed Claims dated Jan. 31, 2008 for U.S. Appl. No. 10/831,382.
Notice of Allowance dated Mar. 27, 2008 for U.S. Appl. No. 11/542,389.
Notice of Allowance dated Jul. 8, 2010 in U.S. Appl. No. 11/682,113.
Office Action dated Jul. 13, 2009 in U.S. Appl. No. 11/682,113.
Office Action dated Dec. 1, 2009 in U.S. Appl. No. 11/682,113.

METHOD AND APPARATUS FOR EVALUATING AND IMPROVING DISK ACCESS TIME IN A RAID SYSTEM

CROSS-REFERENCE TO RELATED APPLICATIONS

This application is a continuation of and claims priority from U.S. patent application Ser. No. 10/831,382, (now U.S. Pat. No. 7,383,400), filed Apr. 22, 2004, which is commonly assigned, and hereby incorporated by reference herein in its entirety and for all purposes.

This application is related to U.S. Pat. No. 7,213,103 and 7,134,053, which are hereby incorporated herein by reference for all purposes.

BACKGROUND OF THE INVENTION

The present invention relates generally to data storage systems for use with computing systems and, more particularly, to techniques for improving performance of the data storage systems.

Most computing systems use a storage device to store data. A disk drive is an example of a storage device that is commonly used with computers, including desktop computers, notebook computers and servers. Disk drives are used for many purposes. Over the years storage devices (e.g., disk drives) have become more advanced so as to offer greater performance and storage capacity. Manufacturers of disk drives provide data sheets or specifications that detail performance and capacity of their disk drives. This is partially attributed to higher performance and storage capacity requirements for some applications.

Data throughput rate for disk drives is essential for certain applications. For example, in the case of streaming data (e.g., audio or video data), time performance is of particular concern because if a data stream is temporarily delayed, the recipient of the data stream receives no data during the delay. The delay can cause slow spots, jitter, or other undesired artifacts to occur in the presentation of the data. By way of example, a real time video playback stream typically requires a relatively high constant data rate. For a 10-bit High Definition (HD) video that outputs about 30 frames per second, this constant data rate amounts to about 165 Mega Bytes (MB) of data per second. Data rates such as this, however, cannot always be maintained using conventional techniques. As a result, significant delays in data access are experienced and often manifest in undesirable effects (e.g., dropping one or more frames of a real time video play back).

Accordingly, techniques for improving the efficiency of data storage systems are needed.

SUMMARY OF THE INVENTION

Broadly speaking, the invention relates to techniques for improving the efficiency of data storage systems. Accordingly, techniques for improving access time for data storage systems are disclosed. These techniques can be used to prevent undesirable access delays that are often experienced in conventional storage systems. As a result, the overall access time can be improved.

In accordance with one aspect of the invention, a "slow-access" criteria is defined for an operation that accesses a storage device. The "slow-access" criteria defines an acceptable access time for the access operation to complete successfully. In one embodiment, "slow-access" is defined as an access operation that does not successfully complete within a predetermined amount of time (e.g., a "slow-access" time or threshold). As will be appreciated, the "slow-access" time can, for example, be defined based on a system requirement, specification, or a particular need of a specific application. As such, a "slow-access" indicates a potential performance problem that can manifest in undesirable effects with respect to a system requirement, specification, or particular need of a specific application. Hence, a data storage system can be evaluated for potential performance problems in accordance with one aspect of the invention. In one embodiment, the data storage system is scanned for "slow-access," by initiating an access operation and determining whether data has been accessed within a predetermined amount of time (e.g., a "slow-access" time or threshold).

In accordance with another aspect of the invention, preventative measures can be taken to prevent occurrence of a "slow-access" once it has been identified. These measures can prevent the occurrence of, for example, a "slow-read" problem. As a result, access time can be improved and undesirable effects experienced in conventional storage systems can be avoided. This also means that specific system or application requirements can be certified and met.

The invention can be implemented in numerous ways, including as a method, system, device, apparatus, or computer readable medium. Other aspects and advantages of the invention will become apparent from the following detailed description, taken in conjunction with the accompanying drawings, illustrated by way of example of the principles of the invention.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION OF THE INVENTION

Figure 1A:
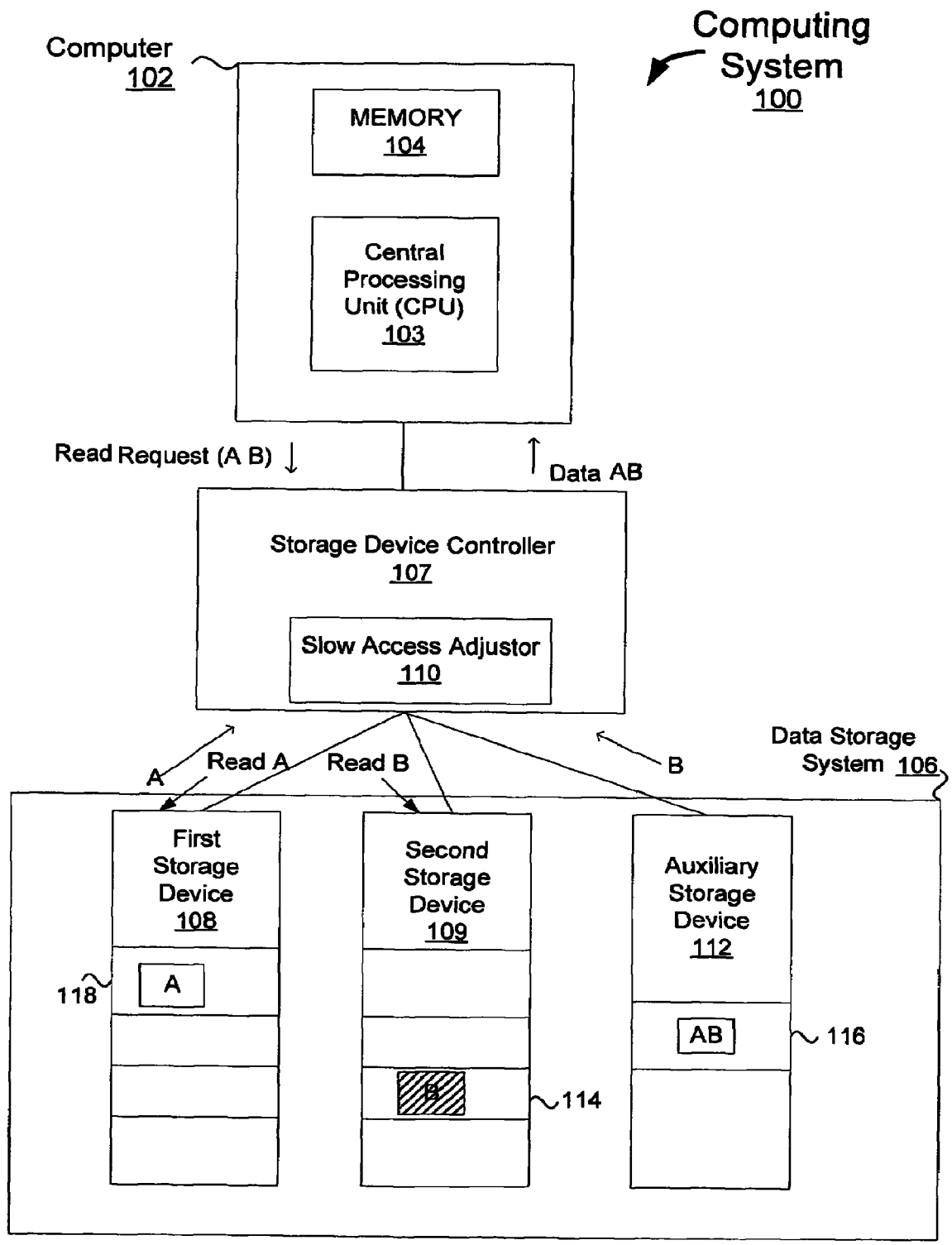
FIGS. 1A-1B depict a computing system according to one embodiment of the invention.

As noted above, conventional data accessing techniques sometimes fail to access data storage systems (e.g., hard drives, disks) at an acceptable rate. One such example is real time video playback where relatively high data rates are required (e.g., 165 MB per second) to display about 30 frames per second. This high data rate cannot be maintained using conventional techniques. As a result, one or more frames can be dropped. Consequently, the real time video is not displayed appropriately.

One reason for this failure is that sometimes it takes significantly longer than expected to access a data storage device (e.g., hard drive, disk). As a result, data cannot be provided in a timely manner. As will be known to those skilled in the art, this delay can be attributed to many factors including, for example, a defective media, vibrations, head defects, or poor storage of write data. One example of a "slow-access" operation is a "slow-read" operation that takes longer than expected or required to read data from a hard drive or disk. It should be noted that unlike an access failure (e.g., a read failure on a bad block), a "slow-access" does not typically generate an error. This means that unlike a read failure, a "slow-read" operation will eventually complete and return the desired data. However, experimental data has confirmed that the delay caused by "slow-access" (e.g., "slow-read") is unacceptable for some applications. Thus, improved techniques for accessing data storage systems are needed.

Accordingly, the invention pertains to improving access time for data storage systems. These techniques can be used to prevent undesirable access delays that are often experienced in conventional storage systems. As a result, the overall access time can be improved.

In accordance with one aspect of the invention, a "slow-access" criteria is defined for an operation that accesses a storage device. The "slow-access" criteria defines an acceptable access time for the access operation to complete successfully. In one embodiment, "slow-access" is defined as an access operation that does not successfully complete within a predetermined amount of time (e.g., a "slow-access" time or threshold). As will be appreciated, the "slow-access" time can, for example, be defined based on a system requirement, specification, or a particular need of a specific application. As such, a "slow-access" indicates a potential performance problem that can manifest in undesirable effects with respect to a system requirement, specification, or particular need of a specific application. Hence, a data storage system can be evaluated for potential performance problems in accordance with one aspect of the invention. In one embodiment, the data storage system is scanned for "slow-access," by initiating an access operation and determining whether data has been accessed within a predetermined amount of time (e.g., a "slow-access" time or threshold).

In accordance with another aspect of the invention, preventative measures are taken to prevent occurrence of a "slow-access" once it has been identified. These measures can prevent the occurrence of, for example, a "slow-read" problem. As a result, access time can be improved and undesirable effects experienced in conventional storage systems can be avoided. This also means that specific system or application requirements can be certified and met.

Embodiments of the invention are discussed below with reference to FIGS. 1A-6C. However, those skilled in the art will readily appreciate that the detailed description given herein with respect to these figures is for explanatory purposes as the invention extends beyond these limited embodiments.

FIG. 1A is a block diagram of a computing system 100 according to one embodiment of the invention. As shown in FIG. 1A, a computer 102 is connected to a data storage system 106 via a storage device controller 107. The computer 102 uses the storage device controller 107 to access data stored in the data storage system 106. In general, the computer 102 can be any computing device that includes at least one Central Processing Unit (CPU) 103 and memory 104. As such, the computer 102 can, for example, be a multi-purpose desktop computer, a server, or a multi-processing server. In any case, the computer 102 uses the data storage system 106 for data storage (e.g., main storage, secondary memory).

It should be noted that the data storage system 106 typically includes a plurality of storage devices (e.g., disks, hard drives). As such, storage device controller 107 can, for example, be a redundant array of independent disks (RAID) controller that controls a plurality of hard drives arranged in one or more disk arrays of a RAID. In addition, the storage device controller 107 provide an interface to the data storage system 106 which can be used by the computer 102 to access data stored in data storage system 106 without having to address each one of the disks individually.

As illustrated in FIG. 1A, these storage devices can, for example, include first and second storage devices 108 and 109. The first and second storage devices can serve as main storage for data and/or auxiliary storage for backup. Although the data storage system 106 can be comprised of several components, it should be noted that from the perspective of the computer 102 the data storage system 106 may be represented a single logical unit. This allows the computer 102 to make logical read, write, or other data access requests without having to individually address various storage devices of the data storage system 106. Upon request, the storage device controller 104 initiates access operations on individual storage devices of the storage device system 106 in order to perform the requested operation (e.g., writes the requested data, reads data and returns it, etc.). Hence, the computer 102 can use the storage device controller 107 to perform various data access operations without having to address the implementation details of the data storage system 106.

Moreover, the storage device controller 107 provides a "slow-access" detector 110 that detects potential performance problems caused by access delays. More particularly, the "slow-access" adjustor 110 initiates an access operation (e.g., read operations) and determines whether the access operation has completed within a predetermined amount of time. This predetermined time typically represents an acceptable access time. If the access operation has not successfully completed within the predetermined amount of time, the operation is identified as a "slow-access (e.g., "slow-read") operation that represents a potential performance problem.

To detect "slow-access," the "slow-access" detector 110 performs a "slow-access" scan on the data storage system 106. This "slow-access" scan can be performed on each of the components of the data storage system 106 individually or it can be performed at the same time on a plurality of components of the data storage system 106. By way of example, "slow-access" detector 110 can first perform a "slow-access" scan on the first storage device 108 and then perform a second "slow-access" scan on the second storage device 109. Alternatively, the "slow-access" detector 110 may scan both the first and second storage device 108 and 109 at the same time.

In any case, each of the sections in a storage device (108 or 109) or a selected number of sections of the storage device can be scanned for "slow-access." By way of example, each of the sections 112, 114, 116 and 118 of the first storage device 108 can be scanned one by one. To scan a particular section, an access operation (e.g., a read operation) is initiated to access data stored in that section. The "slow-access" detector 110 can then determine whether the access operation has completed within a predetermined time period. Again, this predetermined time period can, for example, represent an acceptable threshold for a particular application (e.g., response time needed to maintain a particular data rate). A timer can, for example, be used to measure this predetermined amount of time.

When a "slow-access" scan is performed, the "slow-access" detector 110 can detect whether an access operation has not successfully completed within a predetermined time. As a result, the section that was not accessed by the access operation can be marked for further analysis. In the example illustrated in FIG. 1A, the "slow-access" detector 110 detects that the read operation on section 114 did not successfully complete within a predetermined time period while all other read access operations on other sections did. Hence, section 114 is marked as "slow-access" section for further analysis so that "slow-access" can be avoided when data in section 114 (Data Portion B) is accessed, for example, to run an application. As will be appreciated, several operations can be performed to prevent "slow-access" problems from occurring. By way of example, referring to the example illustrated in FIG. 1A, data portion (B) can be rewritten to the same section 114 or it can be written to a different section of the second storage device 110 (e.g., section 114 can effectively be remapped to another section).

Figure 1B:
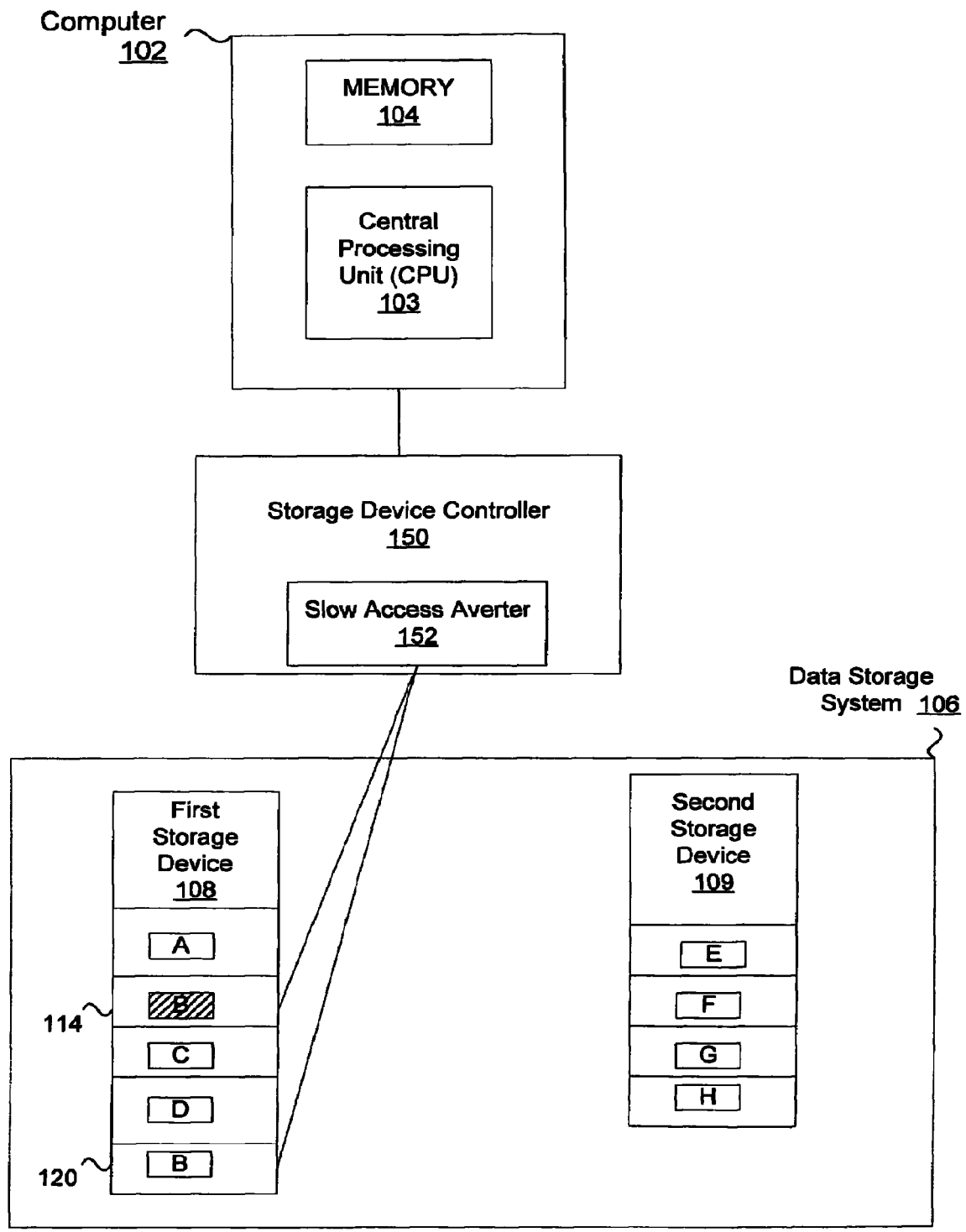

To further illustrate some exemplarily operations that can be performed to prevent occurrence of "slow-access" FIG. 1B depicts a storage device controller 150 in accordance with another embodiment of the invention. The storage device controller 150 provides a "slow-access" averter 152 that performs various operations to prevent "slow-access." These operations are typically performed on a section of a storage device that has been identified (e.g., marked) as having caused a "slow-access" (e.g., section 114). These preventative operations, for example, include rewriting data portion B to the marked section 114 of the first storage device 108. As another example, data originally written to the marked section 114 (data portion B) can be written to another section, namely section 120. In other words, a data portion B can be remapped to a different section of the storage device 110. It should be noted that it is possible that a section of second storage device 109 can also be remapped as the result of remapping data portion B from section 114 to section 120. This may be done so that, for example, sections corresponding to same data (e.g., record) are stored in a "stripe" across the first and secondary storage devices 108 and 109. Furthermore, it is possible to write Data Portion B to the second storage device 109 or get another storage device (not shown).

Furthermore, it will be appreciated that rewriting data to the same sections can eliminate most "slow-access" (e.g., "slow-read") situations. Remapping data, however, may be necessary if rewriting it fails to improve access time. In general, experiments have concluded that most "slow-access" problems can be solved by rewriting and/or remapping data. However, as will be appreciated by those skilled in the art, other operations may be necessary in order to prevent "slow-access." These operations include replacing a storage device entirely, reformatting the drive, etc.

In any case, when a "slow-access" is detected, for example, by the "slow-access" detector 110 of FIG. 1A, appropriate action can be taken to address it, for example, by the "slow-access" averter 152 of FIG. 1B. It should be noted that "slow-access" scanning and aversion are typically performed when the computing system is not processing data for an application (e.g., during maintenance time), but this is not a requirement. Furthermore, it should be noted that typically "slow-access" detector 110 of FIG. 1A and "slow-access" averter 152 are both provided by a storage device controller that can perform both "slow-access" scanning and aversion.

Figure 2:
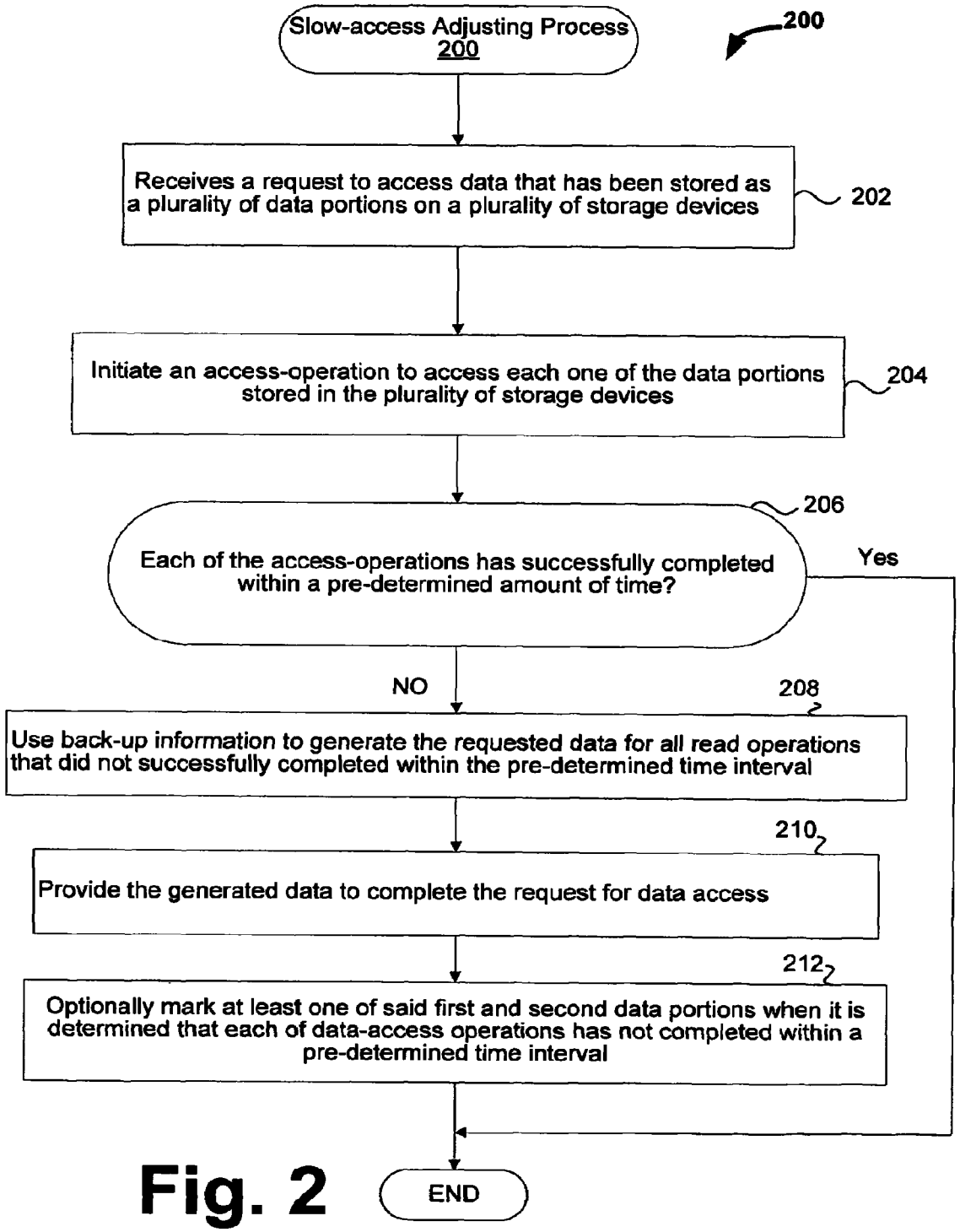
FIG. 2 is a flow diagram of a "slow-access" detection process for scanning at least a portion (e.g., selected portion) of a storage device system according to one embodiment of the invention.

FIG. 2 is a flow diagram of a "slow-access" detection process 200 for scanning at least a portion (e.g., selected portion) of a storage device system according to one embodiment of the invention. The "slow-access" detecting process 200 can, for example, be performed by the "slow-access" detector 110 of FIG. 1A to scan at least a portion of the data storage system 108. Initially, one or more access operations are initiated 202 on one or more storage devices to access data respectively stored in one or more data sections of the storage devices. Thereafter, it is determined 204 whether each of the data-access operations initiated 202 has completed successfully within a predetermined amount of time. Again, it should be noted that the predetermined amount of time represents an acceptable or desirable access time (e.g., "slow-access" threshold). The "slow-access" time, for example, can be determined based on particular performance requirements or expectations of a particular application. In one embodiment, for example, the predetermined time represents a "rolling average" of expected access times that can be adjusted based on various factors, including, for example, different expected access times for different sections of a disk drive. The "rolling average" of expected access times is further illustrated below (see, for example, FIG. 6).

In any case, if it is determined 204 that each of the data-access operations has completed successfully within the predetermined amount of time, the "slow-access" detection process 200 determines 206 whether there are more sections to be scanned and ends accordingly. However, if "slow-access" detection process 200 determines 206 that there are one or more data sections to be scanned, one or access operations on one or more storage devices are initiated 202 to access data respectively stored in one or more data sections that are yet to be scanned.

On the other hand, if it is determined 204 that at least one data access operation has not successfully completed within the predetermined amount of time, the "slow-access" detection process 200 determines 208 whether "slow-access" aversion should be performed on sections that have not been accessed within the predetermined time interval. Accordingly, one or more "slow-access" aversion operations are performed 210. Again, these operations can, for example, include rewriting or remapping of the sections. However, if it is determined 208 that "slow-access" aversion should not be performed now, each one of the sections that has not been accessed within the predetermined time interval is marked 212 as a "slow-access" section so that preventive operations can be performed later. After marking 212, the "slow-access" aversion process 200 initiates 202 one or more access operations if it is determined 206 that there are one or more sections to scan. The "slow-access" aversion process 200 ends when it is determined 206 that all data sections have been scanned. It should be noted that the predetermined time interval can vary for various sections and may be obtained and/or calculated for each section, each time it is needed, based on different "slow-read" expectations or requirements.

Figure 3:
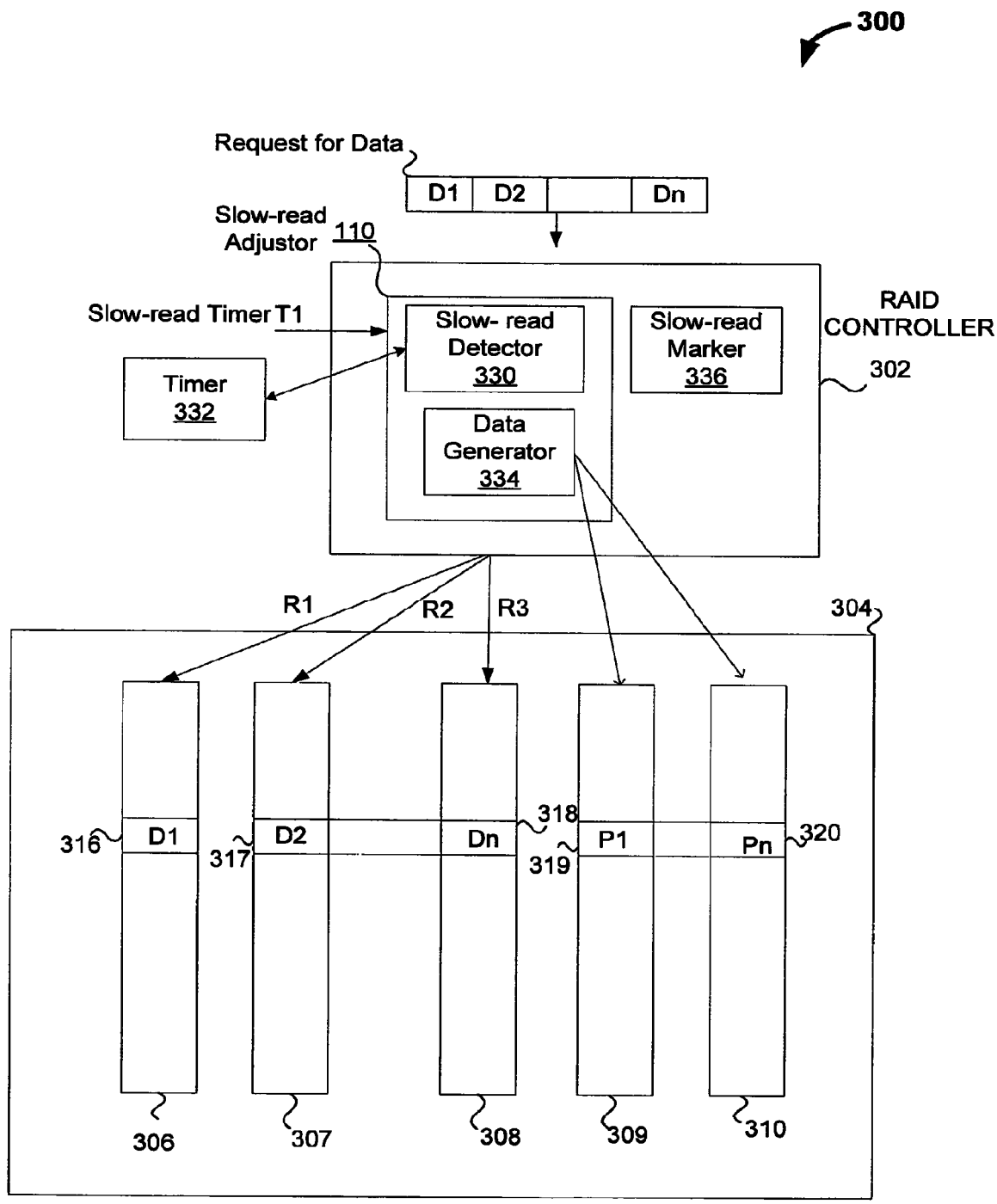
FIG. 3 is a block diagram of a computing system according to another embodiment of the invention.

FIG. 3 is a block diagram of a computing system 300 according to another embodiment of the invention. The computing system 300 depicts a RAID controller 302 provided for a plurality of storage devices arranged as a RAID 304. The RAID controller 302 represents, for example, the storage device controller 107 of FIG. 1 implemented for a RAID 304 in accordance with one embodiment of the invention. For simplicity, the RAID 304 is represented with main storage devices 306, 307 and 308 arranged for respectively storing Data $D_1, D_2, \ldots, D_n$ and auxiliary storage devices 309 and 310 arranged for respectively storing parity $(P_1, \ldots, P_n)$. However, it should be noted that parity information $(P_1, \ldots, P_n)$ may be spread between various storage devices of RAID 304. As such, it is not necessary for a storage device to be designated to store the parity information.

In any case, the RAID controller 302 can receive a request to access Data D (e.g., a record) that has been stored as data portions $(D_1, D_2, \ldots, D_n)$ in RAID 304. In other words, Data D has been stored as a stripe 320 of data across storage devices 306, 307 and 308 respectively as data portions $D_1$, $D_2, \ldots, D_n$ in data sections 316, 317, and 318 of storage devices 306, 307 and 308. Also, parity information $(P_1, \ldots, P_n)$ has been stored across what can be considered the same stripe 320 across the storage devices 309 and 310 respectively in sections 319 and 320 of storage devices 309 and 310. In response to the request for accessing Data D ($D_1$, $D_2$, and $D_n$), the RAID controller 302 can initiate read operations ($R_1$, $R_2$, ..., and $R_n$) respectively on sections 316, 317, ... and 318 of the storage devices 306, 307, ..., and 308. Typically, Data D is provided when read operations ($R_1$, $R_2$, ..., and $R_n$) complete. However, it should be noted that parity information ($P_1$, ..., $P_n$) may be used if necessary to generate data and/or verify data obtained by the read operations. Accordingly, the RAID controller 302 can serve as an interface to the RAID 304. For example, a computer system can use the RAID controller 302 to access data in RAID 304 by requesting a logical access operation (e.g., read D) without having to address individually each of the individual components that actually make up Data D ($D_1$, $D_2$, ..., $D_n$).

Moreover, the RAID controller 302 can detect and avert "slow-access" of data stored in RAID 304. In other words, the RAID controller 302 can perform "slow-read" scans and perform various other operations that can improve read-time of the RAID 304. These operations can, for example, be performed by various components provided for the RAID controller 302 or be combined in a single component (e.g., software or hardware module). As shown in FIG. 3, the RAID controller 302 includes a "slow-read" detector 310, a "slow-read" marker 312 and a "slow-read" averter 314. The "slow-read" detector 310 can detect when a read operation on a section of data in RAID 304 does not complete within a predetermined time interval. When "slow-read" is detected by the "slow-read" detector 310, the section is then marked as a "slow-read" section by the "slow-read" marker 312. The "slow-read" averter 314 can be activated to perform various operations on the marked section(s) in order to improve the read-time.

By way of example, the "slow-read" detector 310 initiates read operations ($R_1$, $R_2$, $R_3$, $R_4$ and $R_5$) respectively on sections 316, 317, 318, 319 and 320 of the storage devices 306, 307, 308, 309 and 310. It should be noted that these sections represent a stripe 320 of RAID 304. The "slow-read" detector 310 also obtains a slow-read-time t1 to measure the time it takes to complete the read operations ($R_1$, $R_2$, $R_3$, $R_4$ and $R_5$). The "slow-read" detector 330 then sets a timer 332 to the "slow-read" time t1. If the "slow-read" detector 310 detects that at least one of the read operations ($R_1$, $R_2$, $R_3$, $R_4$ and $R_5$) has not successfully completed before the timer 332 expires, the "slow-read" marker 312 is activated. The "slow-read" marker 314 marks each section that has not been read within "slow-read" time t1 as a "slow-read" to indicate that the section did not meet the desired read-time requirement (i.e., the "slow-read" time t1). For example, section 317 of the storage device 307 may be marked as a "slow-read" section.

When a section is marked as a "slow-read" section, the "slow-read" averter 314 can perform various operations to improve read-time for the marked section. The "slow-read" averter 314 can, for example, rewrite data portion D2 to section 317, or stripe 320 may be remapped to another stripe, namely, stripe 322. It should be noted that the operations performed by the "slow-read" averter 314 may be performed after section 317 is marked as a "slow-read" section, but before another stripe is scanned for "slow-read." Alternatively, another stripe of data or even an entire disk can be scanned for "slow-read" by the "slow-read" detector 310 before the "slow-read" averter 314 is activated to improve read-time for any marked sections. As will be appreciated, preventative measures are taken to prevent "slow-read" problems from happening on subsequent read operations. As noted above, these preventive measures include, for example, rewriting or remapping data. To further illustrate, FIG. 5 depicts a "slow-read" aversion process 500 in accordance with one embodiment of the invention.

Figure 4:
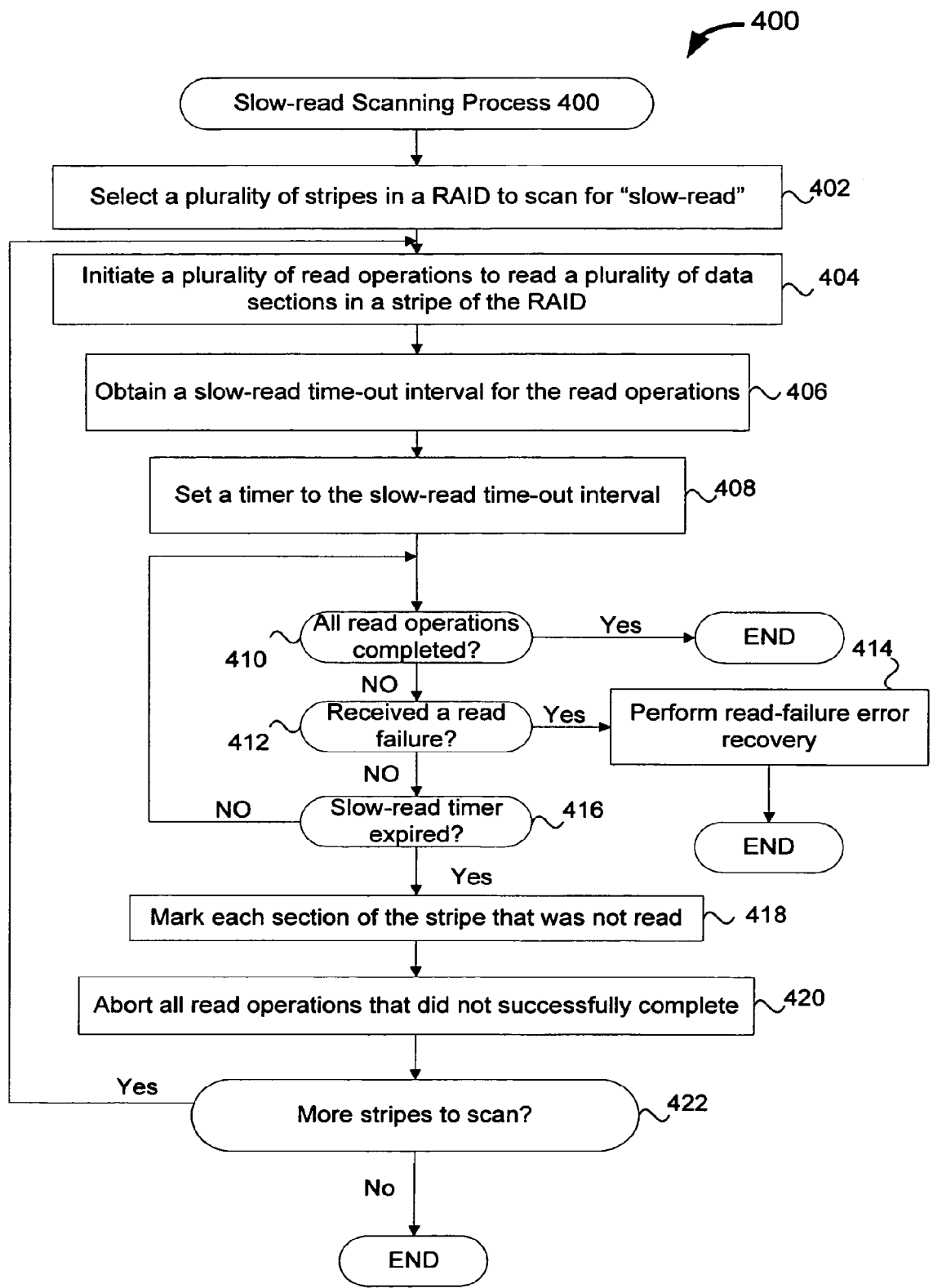
FIG. 4 is a flow diagram for a "slow-read" scanning process depicted according to one embodiment of the invention.

However, referring now to FIG. 4, a flow diagram for a "slow-read" scanning process 400 is depicted according to one embodiment of the invention. The "slow-read" scanning process 400 can, for example, be used by the RAID controller 302 of FIG. 3 to scan the RAID 304 for "slow-read." Initially, the "slow-read" scanning process 400 selects 402 a plurality of stripes in a RAID that are to be scanned for "slow-read." Then, a plurality of read operations are initiated 404 to read a plurality of data sections in a stripe of the RAID. Next, a "slow-read" time-out interval is obtained 406 for the read operations and a "slow-read" timer is set 408 to the "slow-read" time-out interval. Thereafter, it is determined 410 whether all of the read operations have successfully completed. If is determined 410 that all of the read operations have successfully completed, "slow-read" scanning process 400 ends. However, if is determined 410 that at least one of the read operations has not successfully completed, it is determined 412 whether a read failure has been received so that read-failure error recovery can be performed 414. By way of example, an error can be output and conventional read-error recovery is performed. The "slow-read" scanning process 400 ends following read-failure error recovery operation 414.

On the other hand, if is determined 412 that a read failure has not been received, it is determined 416 whether the "slow-read" timer has expired. If it is determined 416 that the "slow-read" timer has not expired, it is determined 410 whether all read operations have completed successfully, and the "slow-read" scanning process 400 proceeds in a similar manner as discussed above. However, if it is determined 416 that the "slow-read" timer has expired, each section of the stripe that was not read before the timer expired is marked 418. All read operations that did not complete successfully are aborted 420. Thereafter, if it is determined 422 whether there is at least one more stripe to scan so that a plurality of read operations can be initiated 404 to read the section in another stripe of the selected 402 stripes of the RAID. The "slow-read" scanning process 400 ends when it is determined 422 that no more stripes should be scanned (i.e., all selected stripes of the RAID have been scanned).

Figure 5:
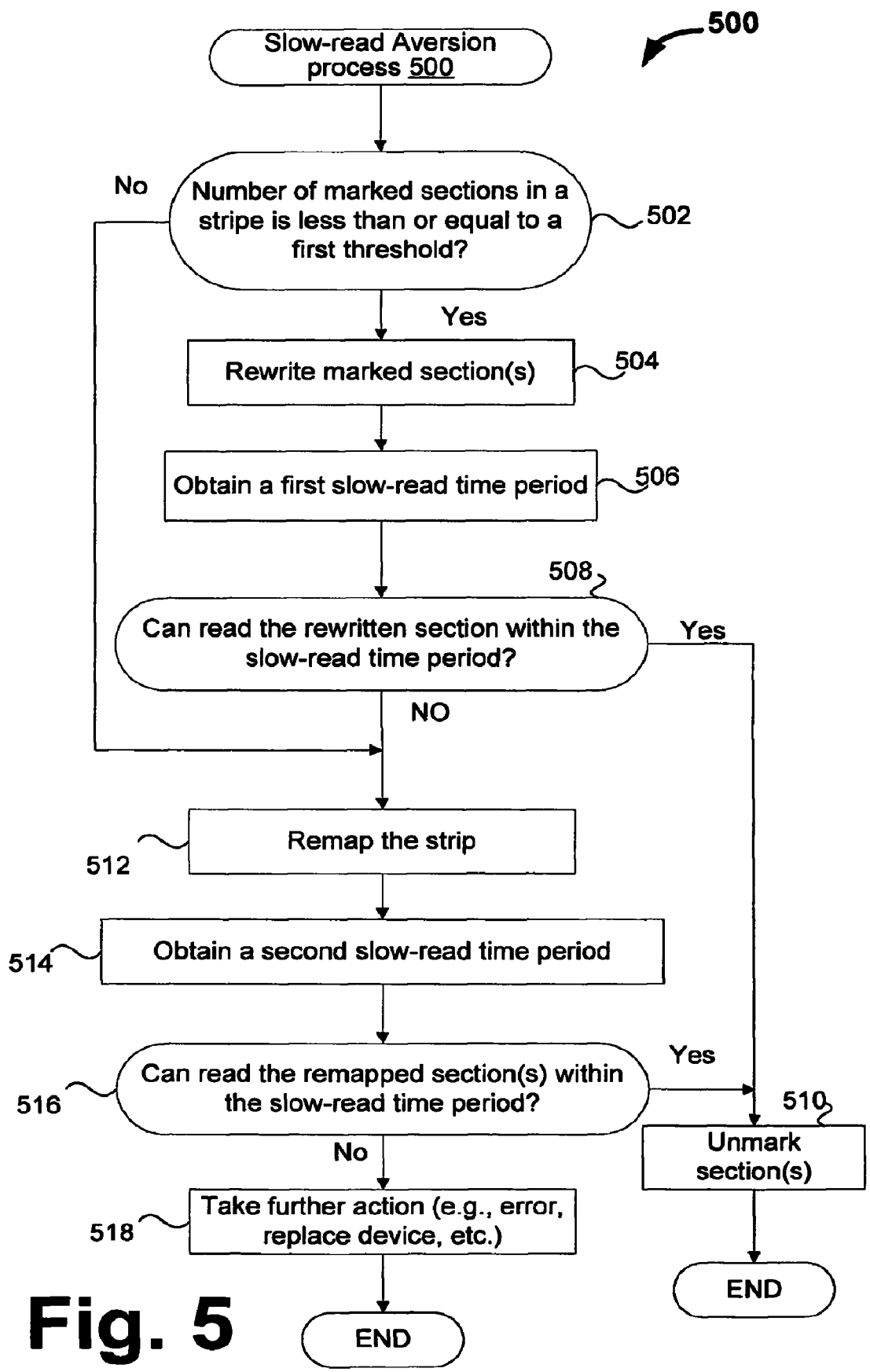
FIG. 5 depicts a "slow-read" aversion process in accordance with one embodiment of the invention.

FIG. 5 depicts a "slow-read" aversion process 500 in accordance with one embodiment of the invention. The "slow-read" aversion process 500 is typically done during maintenance time; however, there is no requirement that any of the operations be performed during maintenance time. The "slow-read" aversion process 500 initially determines 502 whether the number of marked sections in a stripe is less than or equal to a threshold (e.g., two sections in a stripe). If it is determined 502 that the number of marked sections in a stripe is less than or equal to the threshold, the marked section(s) are rewritten 504. Thereafter, a "slow-read" time period is obtained 506, and it is determined 508 whether the data in the section can be read within the "slow-read" time period. In other words, "slow-read" aversion process 500 determines whether the rewriting 504 of the data has solved the "slow-read" problem for the marked sections. To achieve this, it is determined 508 whether data can be read within an acceptable time period (i.e., a "slow-read" time period). If it is determined 508 that the "slow-read" problem is resolved (i.e., rewritten data can be read within the "slow-read" time period), the marked section(s) is unmarked 510 and the "slow-read" aversion process 500 ends.

However, if the "slow-read" aversion process 500 determines 508 that the rewritten data cannot be read within the "slow-read" time period, or if it is determined 502 that whether the number of marked sections in the stripe is greater than the threshold, the strip is remapped 512 to a different cross section of disks. Next, a second "slow-read" time period is obtained 514. As will be appreciated by those skilled in the art, this second "slow-read" period may be determined to be the same as the first "slow-read" time period obtained 506. However, the second "slow-read" time interval may be chosen to be different than the first "slow-read" time period in order to compensate for different read-time expectations, for example, as a result of remapping data which can cause read-time expectations to change. Generally, it should take less time to read sections that are closer to the perimeter of the disk than those situated closer to the center.

In any case, after remapping 512, it is determined 516 whether the remapped section(s) can be read within the "slow-read" time period obtained at operation 514. The "slow-read" aversion process 500 ends following unmarking 510 of the section(s) if it is determined 516 that the remapped section(s) can be read within the "slow-read" time period obtained 514. However, if this is not the case, further action can be taken 518 to resolve the "slow-read" problem. For example, an error can be output, and the disk may be re-formatted or replaced to improve the read time. In any case, the "slow-read" aversion process 500 ends following operation 518.

As noted above, a "rolling average" of expected access times can be used to determine a "slow-read" time out interval. This time interval can be used, for example, as the time period obtained 404 to set a timer 406 as shown in FIG. 4. This "rolling average" can, for example, be determined in a similar manner as an average transfer time determined for data transfer performance monitoring methods illustrated in co-pending U.S. patent application Ser. No. 10/303,121, entitled: METHOD AND APPARATUS FOR DYNAMIC PERFORMANCE EVALUATION OF DATA STORAGE SYSTEMS," filed on Nov. 22, 2002, which is hereby incorporated herein by reference for all purposes.

By way of example, in one embodiment, an average transfer time for the disk drive is obtained. After transferring a first number of data blocks from the disk drive, the transfer time for the time it takes to transfer the first number of data blocks from the disk drive is measured. Thereafter, it is determined whether the measured transfer time is substantially greater than the average transfer time, and a performance error count is increased accordingly when the measured transfer time is substantially greater than the average transfer time. In this way, the average transfer time may be adjusted for more meaningful performance analysis.

As will be appreciated by those skilled in the art, in a similar manner, an average expected read-time for a disk drive can be obtained. After reading a first number of data blocks from the disk drive, the time it takes to read the first number of data blocks from the disk drive is measured. Thereafter, it is determined whether the measured read-time is substantially greater than the average read-time, and a "slow-read" error count is increased accordingly when the measured "slow-read" time is substantially greater than the average expected read-time. In this way, the average expected read time may be adjusted and more meaningful "slow-read" time periods may be obtained for various sections of a disk. More details about the average transfer times are described in co-pending U.S. patent application Ser. No. 10/303,121, entitled: METHOD AND APPARATUS FOR DYNAMIC PERFORMANCE EVALUATION OF DATA STORAGE SYSTEMS," filed on Nov. 22, 2002.

Figure 6:
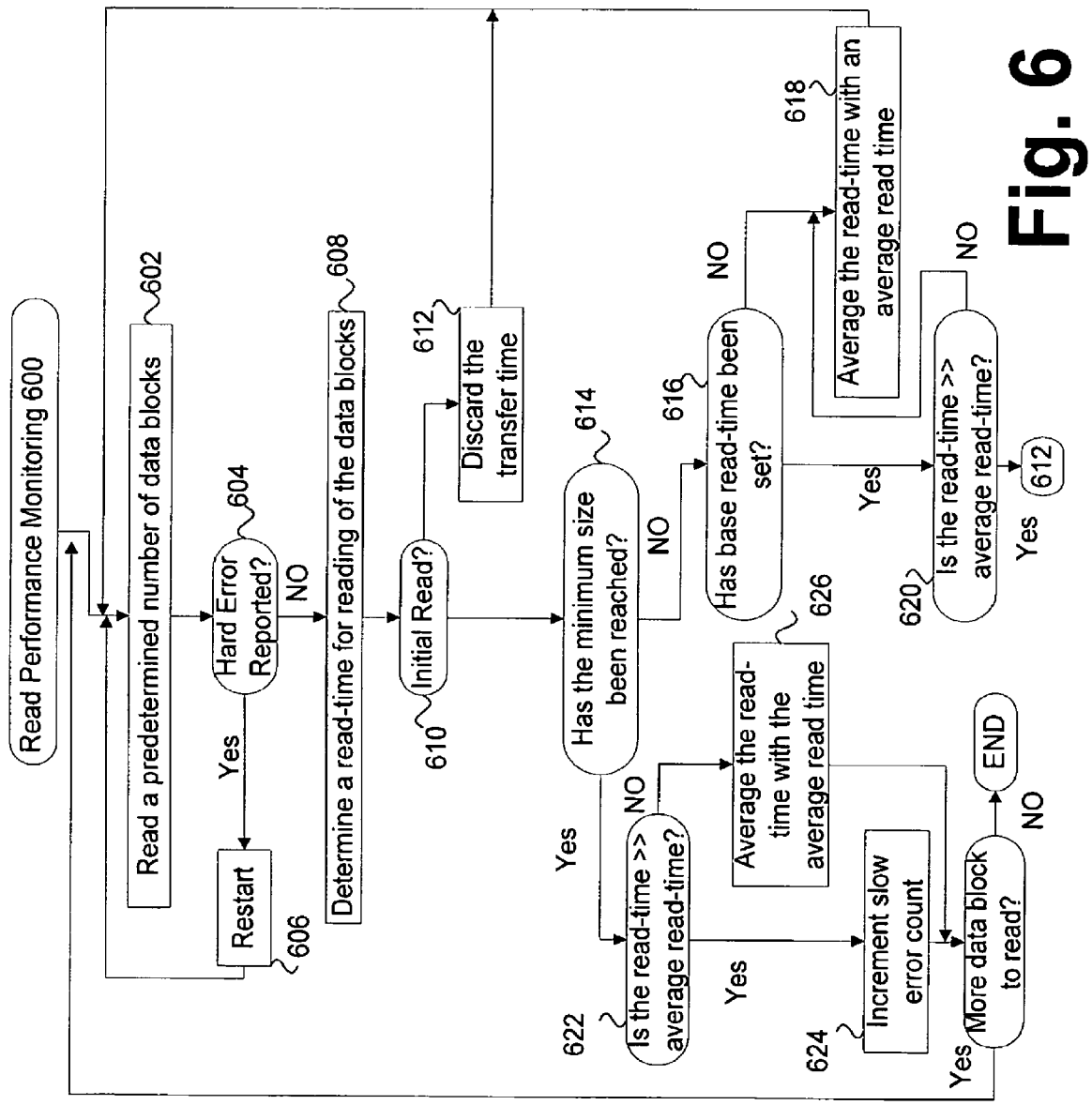
FIG. 6 depicts flow diagrams of a read performance monitoring.

To further illustrate, FIG. 6 depicts flow diagrams of a read performance monitoring 600. The read performance monitoring 600 represents processing that can be performed to, among other things, obtain "slow-read" times used to "slow-read" scanning storage devices for "slow-read". In one application, the storage device being evaluated is associated with a RAID configuration. The read performance monitoring 600 initially reads a predetermined number of data blocks. In one embodiment, a data block represents the smallest amount of data (e.g., 512 bytes) that can be read from a disk drive. The predetermined number of such data blocks can vary with application. For example, the predetermined number can be 100, 200 or 256. In reading the predetermined number of data blocks, a decision 604 determines whether a hard error is reported. The disk drive (e.g., its controller) will report a hard error when the disk drive is unable to correctly read a block of data. In the case in which the decision 604 determines that a hard error has been reported, then the read performance monitoring 600 is restarted 606 with another disk drive, as the current drive is deemed unacceptable. When the predetermined number of data blocks are able to be read 602 without any hard errors, then a read-time for reading of the data blocks is determined 608. Simply put, the read-time is the duration of time it takes to read the predetermined number of data blocks from the selected disk drive.

After the read-time has been determined 608, a decision 610 determines whether the read of the predetermined number of data blocks currently being processed is an initial read. When the decision 610 determines that the read is an initial read, then the read-time is discarded 612 and processing returns to repeat the beginning of the read performance monitoring 600 so that another predetermined number of data blocks can be read and processed. In this case, the initial read is deemed to be inaccurate of a typical data read because various overhead delays cause the read-time to be substantially greater than a steady state read-time.

On the other hand, when the decision 610 determines that the read is not the initial read, then a decision 614 determines whether a minimum sample size has been reached. The minimum sample size represents a number of reads of the predetermined number of data blocks that are to be processed before the system begins to categorize read performance of disk drives. As an example, in one implementation, the minimum sample size can be ten-thousand (10,000) samples. In other implementations, the minimum sample size can vary widely. In one embodiment, the goal of the minimum sample size is to reduce the effect of spurious "slow-reads" on generation of a base read-time.

When the decision 614 determines that the minimum sample size has not yet been reached, a decision 616 determines whether a base read-time has been set. The base read-time represents the read-time associated with a base number of reads. As an example, the number of reads included within the base read can be one-hundred (100). When the decision 616 determines that the base read-time has not yet been set, then the read-time that was determined in operation 608 is averaged 618 together with an average read-time. In other words, the average read-time is a running average of the read-times that are determined 608 (unless discarded). Following the averaging 618 of the read-time with other prior read-times, the read performance monitoring 600 returns to repeat the operation 602 and subsequent operations so that another read of the predetermined number of data blocks can be processed.

Alternatively, when the decision 616 determines that the base read-time has been set, such as after 100 reads have been averaged, a decision 620 can determine whether the read-time (associated with the predetermined number of data blocks currently being read) is much greater than the average read-time. In one embodiment, the read-time can be deemed much greater than the average read-time when the read-time is more than twice the average read-time. Hence, when the decision 620 determines that the read-time is much greater than the average read-time, then the read-time is discarded 612 and the processing returns to repeat the operation 602 and subsequent operations. Here, the discarding of the read-time is used to maintain the accuracy of the read-time such that a read-time that is out of line with the average read-time is not averaged in with the average read-time. The discarding in this case preserves the accuracy of the average read-time so that the average is not skewed. On the other hand, when the decision 620 determines that the average read-time is not much greater than the average read-time, then the read-time is averaged 618 in with the average read-time and the processing returns to repeat the operation 602 so that a next read of the predetermined number of blocks can be similarly processed.

On the other hand, when the decision 614 determines that the minimum sample size has been reached, then the evaluation of the read performance of the disk drive can be evaluated with respect to the average read-time that has been produced. More particularly, when the decision 614 determines that the minimum sample size has been reached, a decision 622 determines whether the read-time that has been determined at operation 608 is much greater than the average read-time. In one embodiment, the read-time can be deemed much greater than the average read-time when the read-time is twice that of the average read-time. In another embodiment, the read-time can be deemed much greater than the average read-time when the read-time is one and a one-half times that of the average read-time.

When the decision 622 determines that the read-time is much greater than the average read-time, then a slow error count for the disk drive being examined is incremented 624. Alternatively, when the decision 622 determines that the read-time is not much greater than the average read-time, then the read-time that was determined at operation 608 is averaged 626 in with the average read-time. Here, by averaging the read-time into the average read-time, the average read-time is further increased with respect to its accuracy. Alternatively, however, the operation 626 could discard the read-time so that the read-time is not included within the average read-time.

In any case, following the operations 624 and 626, a decision 628 determines whether there are more data blocks to read. Typically, the read performance monitoring 600 is performed for a particular disk drive within a RAID configuration. The read performance monitoring 600 reads data from each data block of the disk drive. Hence, in one embodiment, the decision 628 can thus determine whether all the data blocks on the disk drive have been processed through reading the data there from. Accordingly, when the decision 628 determines that there are other data blocks to be read, then the read performance monitoring 600 returns to repeat the operation 602 and subsequent operations so that the remaining data blocks are able to be processed. Alternatively, when the decision 628 determines that there are no more data blocks on the disk drive to be processed, then the read performance monitoring 600 is complete and ends.

In one embodiment, an average read-time is computed each time for each drive. In an alternative embodiment, an average read time can be computed for a particular type and manufacturer drive and then re-used when evaluating read performance of all such like drives. However, with the alternative embodiment, one needs to be wary of possible differences in performance of such like drives that result due to variations in drive configuration.

The advantages of the invention are numerous. Different embodiments or implementations may yield one or more of the following advantages. It should be noted that this is not an exhaustive list and there may be other advantages which are not described herein. One advantage of the invention is that improved performance (e.g., data throughput) of disk drives or RAIDs can be achieved by reducing delay time encountered due to "slow-access" operations. Another advantage of the invention is that "slow-access" scanning and performance enhancing operations can be performed during maintenance time. Still another advantage is that the invention can be implemented to cost effectively improve read performance of RAID by using operations that are well suited for RAID's (e.g., reading, writing or remapping a stripe) using operations that are well suited for RAIDs (e.g., read, write, remapping).

The various aspects or features of the invention described above can be used alone or in various combinations. The invention is preferably implemented by software, but can also be implemented by hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A computing system, wherein said computing system includes a storage system that includes one or more storage devices and the computing system is operable to:
   initiate one or more access operations on said one or more storage devices to access data respectively stored in one or more sections of said one or more storage devices;
   determine whether said one or more sections of said one or more storage devices have been successfully accessed by said one or more access operations within a predetermined amount of time after said initiating of said one or more access operations;
   identify at least one of said one or more sections as an identified section for access time improvement when said determining determines that said at least one section has not been successfully accessed within said predetermined amount of time by said one or more access operations after said initiating of said one or more access operations; and
   rewrite content stored on said at least one identified section to said at least one identified section to improve the access time for accessing said at least one identified section.

2. The computing system of claim 1, wherein said computing system is further operable to:
   remap said at least one identified section in order to improve access time for accessing said at least one identified section.

3. The computing system of claim 1, wherein said computing system is further operable to:
 determine whether said at least one identified section can be accessed within a second predetermined amount of time after said rewriting of said at least one identified section;
 remap said at least one section when it is determined that said at least one identified section cannot be accessed within said second predetermined amount of time; and
 determine whether said at least one identified section can be accessed within a third predetermined amount of time when said remapping remaps said at least one identified section.

4. The computing system of claim 3, wherein said first and second predetermined amount of times are of the same duration.

5. The computing system of claim 3, wherein said computing system is further operable to mark said at least one identified section as a "slow-access" section, thereby indicating that the identified section requires further attention.

6. The computing system of claim 1, wherein said computing system is further operable to:
 select a plurality of sections of said one or more storage devices; and
 initiate a plurality of access operations to access data respectively stored in said plurality of sections; and
 determine whether each of said plurality sections have been successfully accessed within a predetermined amount of time.

7. The computing system of claim 6, wherein said computing system initiates said plurality of access operations one by one.

8. The computing system of claim 6, wherein said computing system initiates said plurality of access operations in parallel.

9. The computing system of claim 1, wherein said one or more access operations include one or more read operations.

10. The computing system of claim 1, wherein said computing system includes one or more storage devices configured as a RAID system.

11. A RAID system including a plurality of storage devices, wherein said RAID system is operable to:
 initiate one or more access operations on one or more storage devices of said plurality of storage devices in order to access data respectively stored in one or more sections of said one or more storage devices;
 determine whether said one or more sections of said one or more storage devices have been successfully accessed by said one or more access operations within a predetermined amount of time after said initiating of said one or more access operations;
 identify at least one of said one or more sections as an identified section for access time improvement when said determining determines that said at least one section has not been successfully accessed within said predetermined amount of time by said one or more access operations after said initiating of said one or more access operations; and
 rewrite content stored on said at least one identified section to said at least one identified section to improve the access time for accessing said at least one identified section.

12. The RAID system of claim 11, wherein said RAID system is further operable to:
 initiate a plurality of access operations to access data stored in a plurality of sections of said one or more storage devices in parallel.

13. The RAID system of claim 12, wherein said RAID system is further operable to:
 initiate a plurality of access operations to access data stored in said plurality of storage devices in parallel.

14. A computing system including a storage device, wherein said computing system is operable to:
 initiate at least one access operation on at least a first section of a storage device;
 determine whether a determined amount of time has elapsed since said initiating of said at least one access operation;
 determine whether said at least one access operation on said at least one section of said storage device has successfully completed when it is determined that said determined amount of time has elapsed; and
 mark said at least one section for access improvement when it is determined that said at least one access operation on said at least one section has not successfully completed and said determined amount of time has lapsed.

15. The computing system of claim 14, wherein said computing system is further operable to perform one or more access improvement operations on said at least one section.

16. The computing system of claim 14, wherein said one or more access improvement operations include one or more of the following:
 one or more rewrite operations to rewrite content stored on said least one section; and
 one or more remapping operations to remap said at least one section to at least one other section of said storage device.

17. The computing system of claim 14, said computing system is further operable to rewrite said at least one section when it is determined that said at least one access operation on said at least one section has not successfully completed and said determined amount of time has lapsed.

18. The computing system of claim 17, wherein said computing system is further operable to:
 determine whether said at least one identified section can be accessed within a second determined amount of time after rewriting said at least one identified section;
 remap said at least one section when it is determined that said at least one identified section cannot be accessed within said second predetermined amount of time; and
 determine whether said at least one identified section can be accessed within a third predetermined amount of time when said remapping remaps said at least one identified section.

19. A method for operating a computing system, wherein said computing system is a storage system that includes one or more storage devices, the method comprising:
 initiating one or more access operations on said one or more storage devices to access data respectively stored in one or more sections of said one or more storage devices;
 determining whether said one or more sections of said one or more storage devices have been successfully accessed by said one or more access operations within a predetermined amount of time after said initiating of said one or more access operations;
 identifying at least one of said one or more sections as an identified section for access time improvement when said determining determines that said at least one section has not been successfully accessed within said predetermined amount of time by said one or more access operations after said initiating of said one or more access operations; and rewriting content stored on said at least one identified section to said at least one identified section to improve the access time for accessing said at least one identified section.

20. The method of claim 19, further comprising remapping the content stored on said at least one identified section if the rewriting fails to improve the access time.

21. The method of claim 19, wherein the predetermined amount of time represents a rolling average of expected access times.

22. The method of claim 21, wherein the predetermined amount of time is adjusted based on the location of the one or more sections on the one or more storage devices.

23. A hardware RAID controller for use in a computer system having a storage device, wherein the apparatus comprises:
   means for initiating at least one access operation on at least a first section of a storage device;
   means for determining whether a determined amount of time has elapsed since said initiating of said at least one access operation;
   means for determining whether said at least one access operation on said at least one section of said storage device has successfully completed when it is determined that said determined amount of time has elapsed; and
   means for marking said at least one section for access improvement when it is determined that said at least one access operation on said at least one section has not successfully completed and said determined amount of time has lapsed.

24. The hardware RAID controller of claim 23, wherein the storage device is one of a plurality of storage devices, including both main storage devices and auxiliary storage devices, controlled by the RAID controller.

25. The hardware RAID controller of claim 23, further comprising:
   means for outputting an error when the at least one access operation on said at least one section has not successfully completed and said determined amount of time has lapsed.

* * * * *

UNITED STATES PATENT AND TRADEMARK OFFICE
CERTIFICATE OF CORRECTION

| | | |
|---|---|---|
| PATENT NO. | : 7,873,784 B2 | Page 1 of 1 |
| APPLICATION NO. | : 12/118611 | |
| DATED | : January 18, 2011 | |
| INVENTOR(S) | : Michael Eng et al. | |

It is certified that error appears in the above-identified patent and that said Letters Patent is hereby corrected as shown below:

In column 8, line 15, delete "41 0" and insert -- 410 --, therefor.

Signed and Sealed this
Eighth Day of November, 2011

David J. Kappos
*Director of the United States Patent and Trademark Office*